United States Patent [19]

Beck

[11] 4,249,314
[45] Feb. 10, 1981

[54] DIVER OPERATED BOTTOM SURVEY SYSTEM

[76] Inventor: Earl J. Beck, 3045 Grove St., Ventura, Calif. 93003

[21] Appl. No.: 541,897

[22] Filed: Jan. 17, 1975

Related U.S. Application Data

[63] Continuation-in-part of Ser. No. 272,599, Jul. 17, 1972, abandoned.

[51] Int. Cl.³ .............................................. G01B 5/28
[52] U.S. Cl. ................................... 33/1 H; 33/1 CC; 33/1 PT
[58] Field of Search ........... 33/1 H, 1 LE, 1 R, 15 A, 33/1 N, 1 PT, 1 MP, 1 CC

[56] References Cited

U.S. PATENT DOCUMENTS

| | | | |
|---|---|---|---|
| 987,863 | 3/1911 | Cram | 33/1 H |
| 2,068,822 | 1/1937 | Schiesser | 33/1 LE |
| 2,396,453 | 3/1946 | Windle | 33/1 LE |
| 2,582,374 | 1/1952 | Dalke | 33/1 R |
| 3,038,273 | 6/1962 | Luketa | 33/1 R X |
| 3,080,655 | 3/1963 | Ailleret et al. | 33/1 H |

Primary Examiner—William D. Martin, Jr.
Attorney, Agent, or Firm—Richard S. Sciascia; Joseph M. St. Amand; Darrell E. Hollis

[57] ABSTRACT

An ocean bottom surveying system comprising a recording mechanism mounted on the ocean floor. A stadia moved about the recording mechanism is connected thereto. Thus, by moving the stadia to various locations in the vicinity of the recording mechanism, a series of values indicating train and elevation relationships are obtained by the recording mechanism. The recorded data is later fed to a read-out system which plots a record showing bottom elevations at various points about the ocean bottom.

5 Claims, 6 Drawing Figures

4,249,314

DIVER OPERATED BOTTOM SURVEY SYSTEM

STATEMENT OF GOVERNMENT INTEREST

The invention described herein may be manufactured and used by or for the Government of the United States of America for governmental purposes without the payment of any royalties thereon or therefor.

CROSS REFERENCES TO RELATED APPLICATION

This application is a continuation-in-part of application Ser. No. 272,599 filed July 17, 1972, now abandoned.

BACKGROUND OF THE INVENTION

1. Field of the Invention

The present invention relates to survey systems and more particularly to diver operated ocean bottom survey systems.

2. Description of the Prior Art

The devices which are used to carry out seafloor surveying include transits, stakes, plumb bobs on a line, and other conventional instruments. However, such devices require fairly level surfaces, the efforts of several people, and good visibility. The present invention provides a means for surveying a rough seafloor surface by a single operator. While primarily used for ocean bottom profiling, the invention could also be used on dry land and could be used at night, in fog, in water having a high sediment content, or any other area where poor illumination might occur.

SUMMARY OF THE INVENTION

The present invention is a system and means of surveying the ocean bottom. A stadia is positioned on the ocean floor at any location with the stadia being electrically connected to a recording mechanism which measures and records certain coordinates. This record is analyzed point by point or read on a computer which shows bottom elevations with respect to each seafloor location.

Accordingly, an object of the invention is to provide a device by which a single, untrained operator can survey a rough underwater surface and obtain an automatically controlled record which may be plotted by a computer to show the sub-aqueous surface profile.

Another object is to provide such a device which will allow a survey to be made of sub-aqueous surfaces under conditions of poor illumination.

Still another object is to provide a device as described which will operate on dry land as well as sub-aqueous surfaces.

Other objects, advantages and novel features of the invention will become apparent from the following detailed description of the invention when considered in conjunction with the accompanying drawings wherein like reference numerals designate like parts throughout the figures thereof and wherein.

DESCRIPTION OF THE PREFERRED EMBODIMENT

Figure 1:
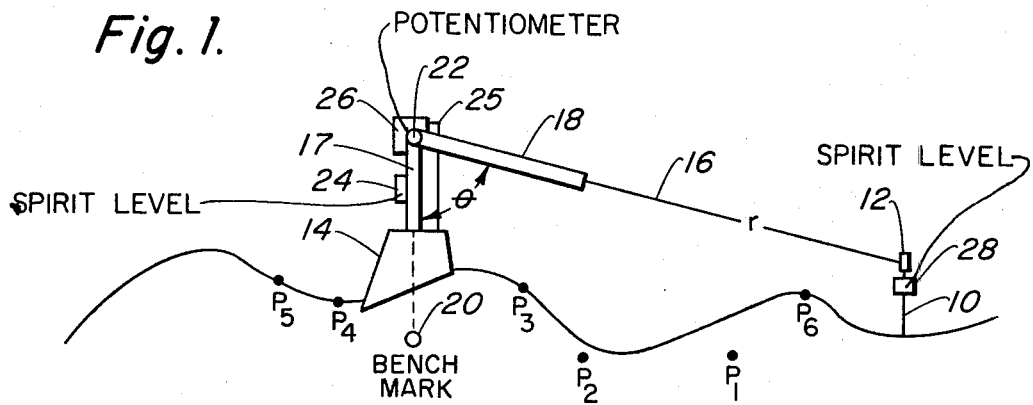
FIG. 1 is a side elevation view of the invention showing the measurement field and apparatus.

Referring to FIG. 1, there is shown a diver operated ocean bottom surveying system suited for use under conditions of poor light and surf, such system comprising a stadia 10 of 2 to 3 feet in height placed at a sub-aqueous point on the ocean floor for which the elevation is desired. At the outer end of the stadia, an operator control button 12 is positioned, said button communicating with an instrument case 14 through a retractable taut cable 16 which extends from the instrument case 14 through vertical rod 17, movable elbow 22, and movable direction rod 18 to stadia 10.

Rigidly affixed to vertical rod 17 is electronic spirit level 24. Electronic spirit level 24 enables a diver to vertically position vertical rod 17 on bench mark 22.

Rigidly affixed to stadia 10 is electronic spirit level 28. Electronic spirit level 28 enables a diver to vertically position stadia 10. It is noted that the water need not be clear for a diver to utilize electronic spirit levels 24 and 28. A diver may carry an underwater light source with him and view the levels 24 and 28 at a distance of a few inches. Also, such devices may be adapted to provide an aural signal when stadia 10 and vertical rod 17 are vertical. Such adaptations are well known in the art.

Electronic spirit levels are commercially available in the art from such vendors as Slope Indicator Company in Seattle, Washington. Such devices measure the angle of inclination from the vertical.

Figure 2:
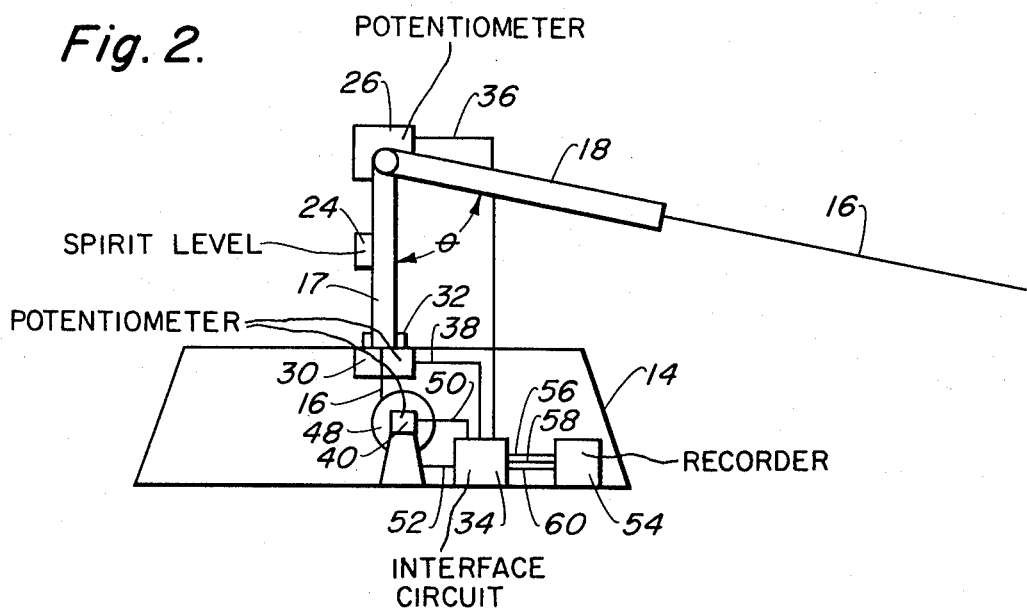
FIG. 2 is a detailed illustration of the interior of the instrument case shown in FIG. 1.
Figure 3:
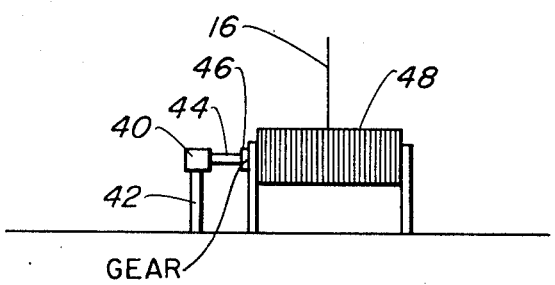
FIG. 3 is a detailed illustration of the spool mechanism of FIG. 2.

Now turning to FIGS. 2 and 3, the instrument case 14 is illustrated in greater detail.

The body of potentiometer 26 is rigidly affixed to vertical rod 17 while the wiper arm of potentiometer 26 is rigidly affixed to movable rod 18. Potentiometer 26 provides an electrical signal indicative of the angular position of movable rod 18 with respect to a reference position. Potentiometer 26 provides information on the theta ($\theta$) angular coordinate of a polar coordinate system in which the survey system records the various positions of stadia 10. This electrical signal inputs interface circuit 34 via line 36.

The body of potentiometer 30 is rigidly affixed to instrument case 14 while the wiper arm of potentiometer 30 is rigidly affixed to vertical rod 17. Vertical rod 17 rotates with respect to instrument case 14 via bearing 32 about a vertical axis. Potentiometer 30 provides an electrical signal indicative of the angular position of vertical rod 17 with respect to a reference position. Potentiometer 30 provides information on the phi ($\Phi$) angular coordinate of a polar coordinate system in which the survey system records the various positions of stadia 10. This electrical signal inputs interface circuit 34 via line 38.

It is noted that vertical rod 17 and movable rod 18 comprise a movable direction rod.

The body of potentiometer 40 is rigidly affixed to instrument case 14 via support 42 while the wiper arm of potentiometer 40 is rigidly affixed to shaft 44. Shaft 44 is rigidly affixed to one side of gears 46. The other side of gears 46 is rigidly affixed to spool 48. Retractable cable 16 is wound up on spool 48. Gears 46 are designed such that the wiper arm on potentiometer 40 makes one revolution for each complete withdrawal of cable 16 from instrument case 14. Thus, potentiometer 40 provides information on the radius (r) coordinate of a polar coordinate system in which the survey system records the various positions of stadia 10. This electrical signal inputs interface circuit 34 via line 50.

Figure 4:
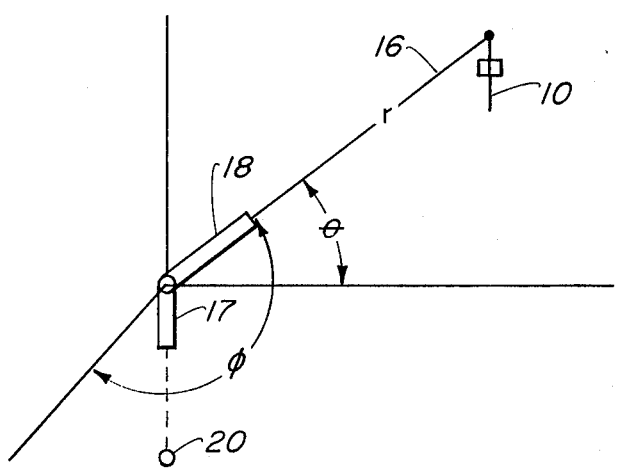
FIG. 4 illustrates in prospective the polar coordinate system with which the survey system measures.

Turning to FIG. 4, the three coordinates, theta ($\theta$), phi ($\Phi$), and radius (r) are illustrated with respect to a bench mark 20.

Also, inputting interface circuit 34 is line 52 which communicates with button 12 through cable 16. Interface network 34 is connected to recording mechanism 54 via lines 56, 58 and 60. Recording mechanism 54 may be any of a variety of devices such as a tape recording system.

Figure 5:
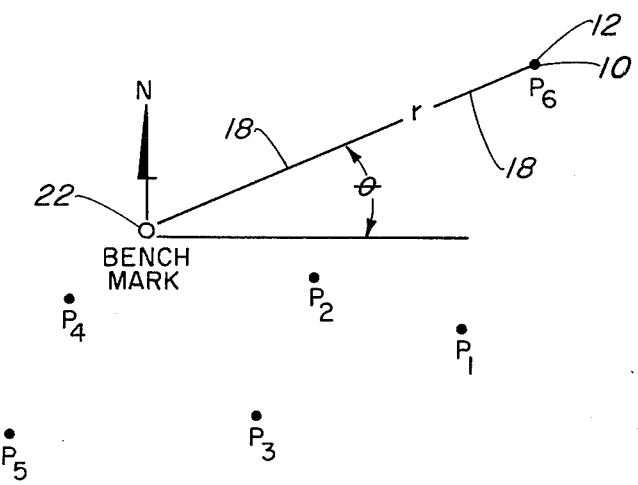
FIG. 5 is a top plan view of the invention showing the required measurement field.

The survey system operates as follows. A diver (not shown) positions instrument case 14 and vertical rod 17 on bench mark 20 such that vertical rod 17 is vertical. Next, the diver (not shown) places stadia 10 on the desired measurement point such as $P_1$ in FIG. 5 and then vertically positions it. At this point, the diver (not shown) depresses button 12 thus signalling interface network 34 to output signals on lines 56-60 to recording mechanism 54. The signals on lines 56-60 are recorded and the diver is ready to position the stadia on the next measurement point. The recording mechanism 54 automatically advances the tape so that the recorded information is not lost or distorted by the next recordation.

It is noted that interface circuit 34 receives electrical signals from potentiometers 26, 30, and 40, makes them compatible with recording mechanism 54, and then outputs them on lines 56, 58 and 60 respectively, whenever a signal is received on line 52 indicating that the diver (not shown) has depressed button 12. Interface circuit 34 is a commonly utilized circuit in the art.

Figure 6:
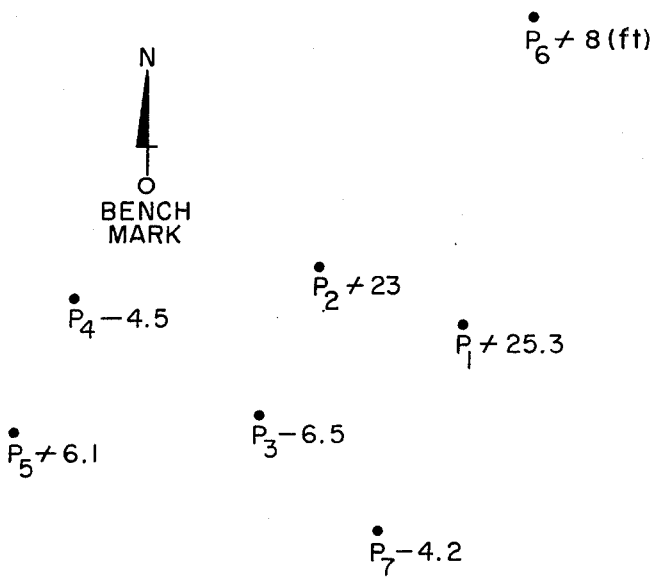
FIG. 6 is a schematic view of the plot of sea bottom elevations taken at random.

The information on the tape of recording mechanism 54 is eventually fed to a read-out system (not shown) which plots a record showing the bottom elevation at various points about the ocean bottom with respect to bench mark 20 (FIG. 6).

It is envisioned that stadia 10 may be equipped with sensors such as electronic spirit levels that communicate with recording mechanism 54 to provide information as to the position of stadia 10 with respect to the vertical. This information could be utilized to eliminate any errors introduced into the survey due to stadia 10 being in a non-vertical position. This would eliminate the necessity of the diver (not shown) positioning stadia 10 vertically.

It is also envisioned that retractable cable 16 would be useful in an area of about 300 feet in radius, considerably more than any of the conventional prior art devices.

Obviously, numerous modifications and variations of the present invention are possible in light of the above teachings. It is therefore to be understood that within the scope of the appended claims the invention may be practiced otherwise than as specifically described herein.

What is claimed is:
1. A diver operated bottom surveying system suited for use under conditions of poor light and surf comprising:
   a. a stadia vertically placed at a point for which the elevation is desired;
   b. an instrument case vertically positioned on a known bench mark;
   c. a movable direction rod secured to said instrument case;
   d. a retractable cable extending from the case and through said direction rod, said cable being attached to said stadia;
   e. means on said direction rod and in said instrument case for sensing the two bearing angles and radius of said stadia with respect to said bench mark; and
   f. means in said case communicating with said sensing means for recording the two bearing angles and the radius of said stadia with respect to said bench mark.

2. The apparatus of claim 1 further comprising means for controlling the recording of the two bearing angles and the radius from said stadia, said means being located in said instrument case and on said stadia.

3. The diver operated surveying system as defined in claim 1 wherein the movable direction rod further comprises:
   (a) a vertical rod extending vertically out of said instrument case, said vertical rod being rotatable about a vertical axis;
   (b) a horizontal rod; and
   (c) a movable elbow connected between said vertical rod and said horizontal rod such that said horizontal rod moves in a horizontal plane with respect to said vertical rod.

4. The apparatus of claim 1 wherein said sensing means comprises a plurality of potentiometer.

5. The diver operated surveying system of claim 1 further comprising:
   a. a vertical-attitude-determining sensor positioned on said direction rod; and
   b. a vertical-attitude-determining sensor positioned on said stadia.

* * * * *